Oct. 9, 1951 W. W. SMITH 2,570,726
CONVEYANCE LOADING APPARATUS
Filed Oct. 19, 1948 3 Sheets-Sheet 1

Fig. 1

INVENTOR.
William W. Smith
BY Albert J. McCaleb
Attorney

Oct. 9, 1951 W. W. SMITH 2,570,726
CONVEYANCE LOADING APPARATUS
Filed Oct. 19, 1948 3 Sheets-Sheet 2

INVENTOR.
William W. Smith
BY Albert G. McCaleb
Attorney

Oct. 9, 1951 W. W. SMITH 2,570,726
CONVEYANCE LOADING APPARATUS
Filed Oct. 19, 1948 3 Sheets-Sheet 3

INVENTOR.
William W. Smith
BY Albert G. McCaleb
Attorney

Patented Oct. 9, 1951

2,570,726

UNITED STATES PATENT OFFICE 2,570,726

CONVEYANCE LOADING APPARATUS

William W. Smith, Portland, Oreg., assignor to Hyster Company, Portland, Oreg., a corporation of Oregon Application October 19, 1948, Serial No. 55,412

23 Claims. (Cl. 214—113)

This invention relates to a loading apparatus which is particularly adapted to use on or in association with movable equipment upon which the load is to be conveyed.

One of the general objects of my invention is to provide loading apparatus and a loading method which minimize or eliminate the manual effort required for loading an object onto the load carrying portion of a conveyance.

Within the purview of my invention, I have also provided a method and apparatus by which objects for conveyance can, with relative ease and rapidity, and without the aid of skids or the like, be loaded to a carrying position on a movable carrier from supporting surfaces.

This invention comprehends the provision, with load carrying arms of an industrial lift truck or the like, of a remotely controllable and at least partially automatically operable load engaging part for effecting temporary movement of the side of the load adjacent the carrying arms to a raised position such that, and during which, the load carrying arms are moved to positions beneath the load.

As another object, the invention embodies the provision of an effective arrangement of load carrying and moving rollers, adapted to be driven during movements of a load conveyance for effecting the movement of the load onto or from the load carrying part of the conveyance.

As a corollary to the preceding objects, my invention contemplates the provision of loading apparatus embodying a load tilting part which facilitates the introduction of a carrier beneath the load and rollers adapted selectively to be driven for shifting the load onto and from the carrier.

My invention further comprehends the provision, in apparatus such as that referred to, of a load lifting instrumentality suited to the lifting of articles housed in cartons or the like which are limited to some extent in the resistance to tearing or breaking.

Another object of this invention is to provide a load lifting instrumentality adapted to be moved into lifting engagement with an object to be loaded by a propelling force after being positioned for effecting such engagement.

I have also provided, in association with my load lifting instrumentality, a part adapted to the limiting of the depth to which that instrumentality can penetrate a load housing and a part adapted to facilitate the withdrawal of the load engaging portion of said instrumentality from a load during operation.

It is also within the purview of my invention to provide efficient and effective structures and part arrangements for both the roller combinations and my load tilting part whereby their operation is effected during movements of the carrier.

Other objects and advantages of the invention will be apparent from the following description and the accompanying drawings in which similar characters of reference indicate similar parts throughout the several views.

Referring to the three sheets of drawings:

Figs. 8 to 13 inclusive are a series of side elevational views depicting in sequential order the steps of effecting the placement of a load on the lifting structure of the exemplary industrial lift truck from a load supporting surface with the aid of my disclosed invention and without the use of a skid, platform or the like;

Although my presently disclosed method and apparatus for effecting the placement of a load on the load carrying portion of a conveyance from a load supporting surface, such as a floor, without the aid of a skid or platform, such as customarily used, are adaptable to other types and forms of conveyances, as may be readily understood from the description, the industrial lift truck provides one type of conveyance to which my invention is well suited and which is quite generally used and known. As a matter of general information, the industrial lift truck shown for exemplary purposes in Fig. 1 has a body 20 which encloses power means, such as an internal combustion engine and carries a seat 22 on which the operator sits. The disclosed lift truck has spaced and coaxial front wheels such as 23 and a single steerable wheel covered by the body and controlled by a steering wheel 24.

Figure 1:
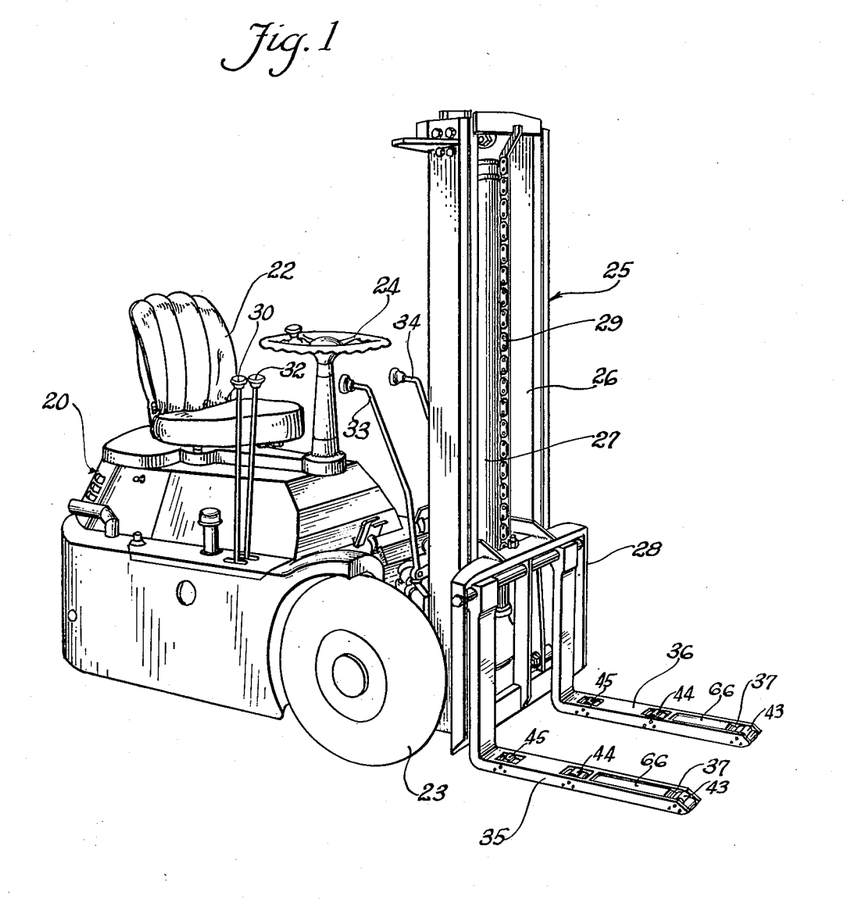
Fig. 1 is a perspective view taken from one side and somewhat to the front of an industrial lift truck to which a preferred embodiment of my invention is applied, in the present instance, for illustrative purposes.

At the front end, the truck has a load lifting and carrying structure which is indicated generally by the reference numeral 25. This load lifting and carrying structure, in the present instance, includes an extensible frame 26 actuated for vertical movement by a hydraulic ram 27, and upon which a carriage 28 is mounted for vertical movement along the frame as it is extended by the action of the ram; the carriage having a lifting connection to the frame through a chain 29. Movements of the truck and the operation of the carriage are controlled by the operator from his position on the seat by movement of control elements such as hand levers.

It has been customary in the past to place the loads which are to be transported on skids, platforms or the like, which skids or platforms have an elevated base and an open end, or some such structure, whereby forwardly projecting load carrying arms 35 and 36 of the carriage 28 can be passed under the load for lifting purposes. The placement for lifting and transportation of loads, such as shipping crates or boxes, from flat surfaces, such as a floor, and without the aid of a skid or platform, presented a problem and required additional lifting equipment or manual aid. Through the use of my disclosed apparatus and method, a lift truck operator, unaided and without the use of additional equipment, is enabled to effect the placement of a load upon the arms from a flat surface by manipulations of the carriage and truck accomplished from the operator's seat.

Having general reference to the drawings, both load carrying arms 35 and 36 are similarly equipped with the apparatus constituting a portion of this invention, and by which apparatus the method is carried out in a preferred manner. This structure and its application to each arm being substantially the same as that for the other, a description of one will suffice for both.

Figure 2:
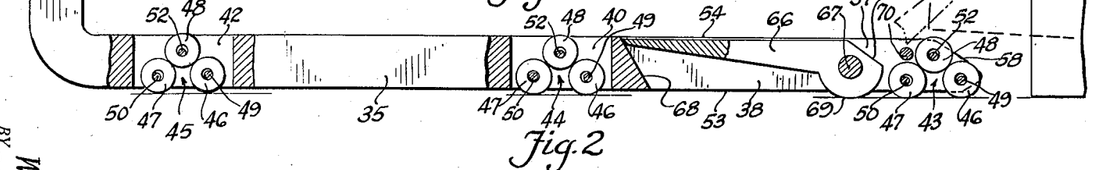
Fig. 2 is a fragmentary side elevational view, drawn to a scale larger than that used for Fig. 1, and depicting a load lifting arm of the lift truck of Fig. 1, with parts thereof shown in section and with the positions of certain parts indicated in dotted lines to illustrative the adaptation of my invention thereto.
Figures 3, 5, 7:
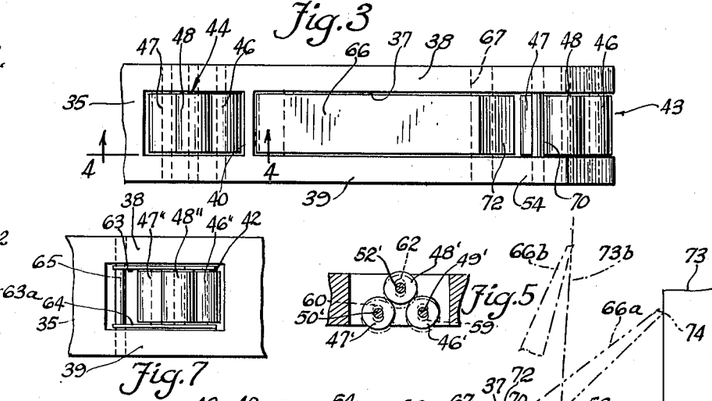
Fig. 3 is a fragmentary top plan view of a portion of the load lifting arm shown in Fig. 2.
Figs. 5 and 6 are each fragmentary side sectional views similar to Fig. 4 which depict modifications of portions of the structure adapted to my invention.
Fig. 7 is a fragmentary top plan view of the structure shown in Fig. 6.

As depicted in Figs. 1, 2 and 3, the front or projecting ends of the arms 35 and 36 are vertically slotted inwardly in a longiudinal direction from the ends and for a substantial portion of their length to provide slots 37 between longitudinal and substantially parallel side portions 38 and 39. At spaced positions longitudinally of the arms, openings 40 and 42 extend vertically through the arms. In the slot 37 adjacent the front or projecting ends of the side portions 38 and 39 and in the openings 40 and 42, similar groups 43, 44 and 45 of rollers 46, 47 and 48 are carried for rotation by cross shafts 49, 50 and 52 respectively.

Figures 4, 6:
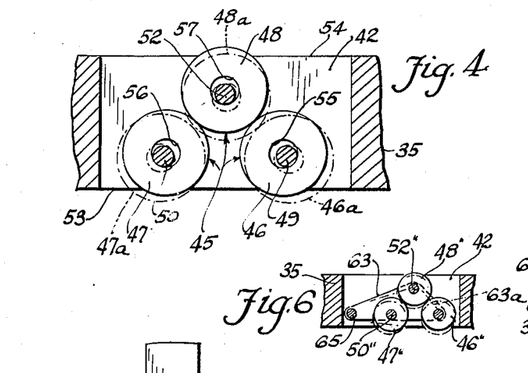
Fig. 4 is a fragmentary side sectional view, drawn to an enlarged scale, which shows the details of a portion of the structure embodied in the preferred form of my invention.

In the form of the invention disclosed in Figs. 2, 3 and 4, the shafts 49, 50 and 52 extend in parallel relationship across the end portion of the slot 37 and have their ends fixedly secured in the side portions 38 and 39. By preference, the relative disposition of the shafts for each group of rollers is such that their axes are placed at the corners of a figure of triangular shape, with the axes of the shafts 49 and 50 spaced at substantially equal distances from a lower surface 53 of the arm 35. Longitudinally of the arm 35, the shaft 52 is disposed at a position substantially mid-way between the shafts 49 and 50, although the shaft 52 is disposed at a greater distance from the lower arm surface 53 than are the shafts 49 and 50.

In my preferred roller arrangement, the rollers 46, 47 and 48 are of practically equal diameter, which diameter is so related to the placement of the shafts 49, 50 and 52 and the thickness of the arm 35 that when each of the rollers 46 and 47 is in firm frictional engagement with the surface of the intermediate roller 48, the rollers 46 and 47 have surface portions exposed and extending below the lower surface 53 of the arm for rolling engagement with a supporting surface, while a surface portion of the roller 48 is exposed and extends above an upper surface 54 of the arm for rolling engagement with a load. It is also my preference, as depicted in Fig. 4, that for the disclosed mounting shaft arrangement, the rollers 46, 47 and 48 shall have over size bearing openings 55, 56 and 57 respectively, so that each fits loosely upon its shaft to allow for lateral movement relative to the shaft and maintain effective frictional engagement between the roller surfaces even though the positions of the rollers are varied as indicated by dotted lines at 46a, 47a and 48a by contact with an adjacent surface.

With the roller arrangement disclosed, it may be noted that when the rollers 46 and 47 are frictionally driven in either direction by contact with a surface, such as that of a floor, during movements of the truck, the roller 48 is frictionally driven from and by the surface contacting rollers and in a direction opposed to that of the surface contacting rollers; the surface speed of the upper rollers being substantially equal and opposite to that of the surface engaging rollers. For the present purposes, it is my preference that the speed of the driven roller 48, in each instance, shall be at least equal to that of the surface engaging rollers 46 and 47, so as to minimize a tendency for slippage as the rollers are moved under a load by truck movement while being driven by contact with a floor surface.

The spacing of the roller groups 43, 44 and 45 longitudinally of the arms is such that after a load has been placed with one side resting on the roller 48 of the group 43 at the extending end of the arm, and while the rollers are driven by contact with a floor surface as they are passed under the load by movement of the truck, the load will be supported for rolling movement across the rollers as a result of the rollers being driven and after the load is completely off of the floor surface. It is also noteworthy that at the extending ends of the load carrying arms, one group of rollers is disposed close to the arm end, and the arm is preferably tapered, as at 58 to facilitate and insure the ease of placement of a load upon the rollers at the beginning of a loading operation, or the removal of a load therefrom by reverse operation. It may be pointed out that a load may be moved in either direction relative to the arms, depending upon the direction of movement of the truck while the rollers are in contact with the floor.

In the modified roller arrangement disclosed in Fig. 5, the general roller arrangement is the same as that described with respect to Fig. 4, but the rollers 46', 47' and 48' are secured to their respective shafts 49', 50' and 52'. In this instance, play for movement of the rollers in a direction transverse to their axes is provided by bearing openings 59, 60 and 62 in the side portions of the arm which are elongated in a direction lateral to the arm.

Another modified roller support arrangement is depicted in Figs. 6 and 7. In the structure of the latter mentioned figures, side plates 63 and 64 disposed within and on opposite sides of the opening 42 are hingedly supported for swinging movement laterally of the arm by cross shaft 65; the opposite ends of the shaft 65 being secured to the side portions of the arm, and the plates being mounted for rotational movement thereon. Again, in this instance, the general disposition of the rollers 46'', 47'' and 48'' and their axes is similar to that described. However, the ends of the respective shafts 49'', 50'' and 52'' are carried by the opposed side plates 63 and 64, so that vertical movement of the rollers relative to the arm to compensate for variations in the position of the arm are effected by vertical swinging movements of the rollers with the side plates 63 and 64, as indicated in dotted lines at 63a in Fig. 6.

As has been pointed out, it is the function of the rollers to facilitate and effect the movements of a load along the arms or load carrying portion of the conveyance during loading and unloading and in response to the rollers being frictionally driven by engagement with a floor surface. Thus, the operator is able to move a load onto or from the arms by manipulations of the truck which are accomplished from the driver's seat. On a lift truck of the type disclosed, the rollers or their respective supports preferably have sufficient play for movement laterally of the arms that when the carriage 28 is raised to lift the load, the weight of the load is carried directly by the arms, while the rollers drop to a position out of engagement with the load when the rollers are moved away from a supporting floor surface.

In addition to facilitating and effecting the movements of a load relative to the loading carrying portion of a conveyance by movements of the conveyance, I have also provided additional structural elements by which the load may be raised and placed upon the rollers; the latter structural elements also being operable by and in response to movements of the conveyance. Rearwardly of the end group 43 of rollers, a prod-type lever 66 is supported at one of its ends for swinging movement in a vertical plane by a cross shaft 67. In the present instance, the opposite ends of the cross shaft 67 are secured to the side portions 38 and 39 of the arm and the lever 66 is mounted for rotational movement thereon between those side portions and in the slot 37. In its normal or retracted position, the lever 66 extends longitudinally of the arm and its free end engages an obliquely disposed stop surface 68 at the end of the slot 37 to locate the arm in an out-of-the-way position between the side portions 38 and 39 of the arm, as shown in solid lines in Fig. 2.

At the mounted end of the lever 66, it is provided with an arcuate surface 69 which is substantially concentric with the axis of the shaft 67 and normally faces downwardly for floor engagement when the lever is disposed in the normal or retracted position. The radius of the arcuate surface is such that it is adapted to engage a floor surface while the lower rollers of the groups are in frictional driving engagement with the floor. With this arrangement, the lever 66 may be swung upwardly and forwardly by forward movement of the truck while the arcuate surface 69 engages the floor. A stop 70 which, in the present instance, comprises a cross shaft extending between and secured to the side portions 38 and 39 of the arm serves to determine a load engaging position of the lever, in which that lever projects upwardly and forwardly, as indicated in dotted lines at 66a in Fig. 2. It is my preference to provide a substantially flat surface portion 72 at the mounted end of the lever adjacent and adjoining the arcuate surface 69, which flat surface engages the floor when the lever is in the load engaging position, and thereby releasably resists the retraction of the lever from that load engaging position.

The length of the lever 66 is such that in its load engaging position it extends upwardly and over the end group 43 of rollers to engage a load such as that depicted at 73 in Fig. 2, well above the floor level and at a position spaced ahead of the ends of the arm and the end group 43 of rollers. Also, the length of the lever and the position of the stop 70 are such that the upward and forward slope of the lever, in the load engaging position, effects a substantial prodding action of the end of the lever against the load when that end of the lever is forcibly brought into engagement with the load by forward movement of the truck; the prodding action being a result of a force component parallel to the floor. The angle of the lever in the load engaging position is also such that force applied horizontally through the lever and as a result of movement of the conveyance toward the load after engagement of the lever with the load produces a substantial vertical component of force for lifting the load as the lever is forced to swing upwardly and away from the stop 70. The approximate angle of projection of the lever for the defined purpose, and as depicted at 66a in Fig. 2, may be, for example, about 45 degrees above the horizontal. It is, by preference, also, that the end surface of the lever 66 is disposed to provide a relatively sharp load engaging edge 74, which prods the side surface of the load and thereby attains a "grip" or "hold" for lifting the load.

With the disclosed structure, the load is lifted by the prod-type lever as the conveyance is moved toward the load after engagement of the lever with the adjacent side of the load. The positions of the lever and load during such lifting action are indicated at 66b and 73b respectively, in Fig. 2. As the lever swings upwardly and rearwardly while the load is lifted thereby, the end group 43 of rollers reaches a position beneath the load before the angle of the lever becomes sufficiently close to the vertical position to release the load so that it drops upon the end group of rollers. After such release, continued movement of the conveyance toward the load forces the load onto the arms and forcibly moves the lever 66 back to its retracted position.

Figure 8:
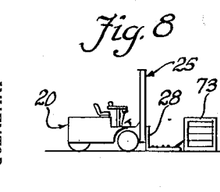
Figure 9:
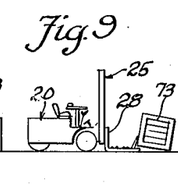
Figure 10:
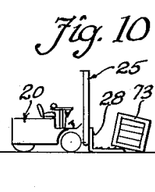
Figure 11:
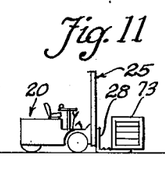
Figure 12:
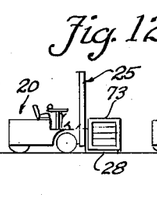
Figure 13:
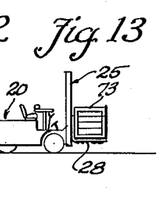

Sequential operating positions depicting the actions of both the load lifting lever and the frictionally driven rollers during a loading operation are illustrated in Figs. 8 to 13 inclusive. The removal of a load from a conveyance is accomplished by a reversed sequence. Fig. 8 indicates the starting position in which the carriage of the lift truck has been lowered to a position in which the rollers are in contact with the floor and the prod-type load lifting lever has been raised to its forwardly and upwardly projecting position and brought into engagement with the side of the load. In Fig. 9, the truck has been moved toward the load to a position such that the side of the load is raised by the action of the lever and the first group of rollers is under the raised edge of the load. In Fig. 10, one edge of the load is still in contact with the floor but the loading is being effected by the movement of the truck toward the load and the action of the frictionally driven rollers. Fig. 11 shows the load while being carried rearwardly by the frictionally driven rollers, which latter action of the rollers continues until the load reaches the position depicted in Fig. 12. The load may then be raised with the carriage, as shown in Fig. 13, in which instance the weight of the load is preferably carried directly by the load lifting arms.

Figure 14:
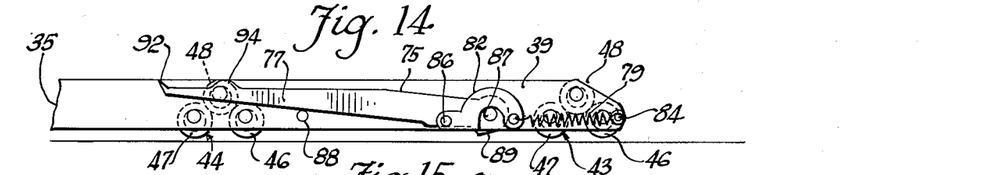
Fig. 14 is a fragmentary side elevational view of a load carrying arm which has attached thereto a modified form of a load lifting element adapted to use in my invention.
Figures 15, 16, 17, 18, 19:
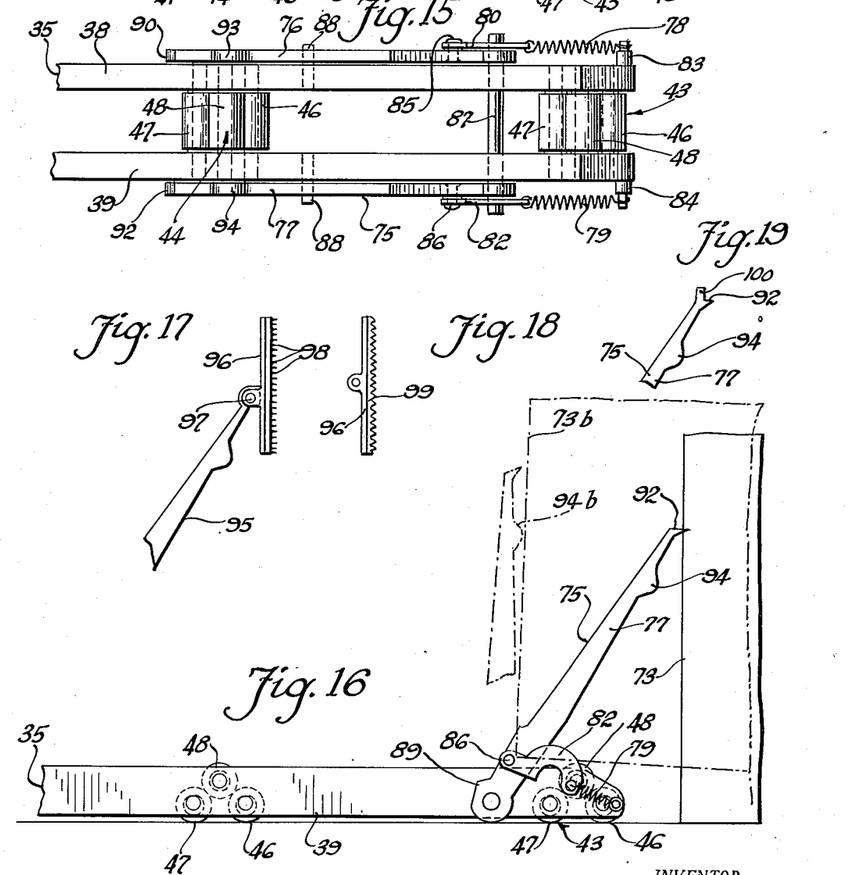
Fig. 15 is a top plan view of a structure shown in Fig. 14.
Fig. 16 is a fragmentary side elevational view of the structure depicted in Fig. 14 which illustrates a different operating position of the parts and indicates the coaction of the parts with a load during a loading operation.
Fig. 17 is a fragmentary side elevational view depicting a modified load lifting part adapted to use with certain types of loads.
Fig. 18 is a side elevational view showing a modification of the load lifting part illustrated in Fig. 17.
Fig. 19 is another modification of a portion of a load lifting element adapted to be utilized with the structures disclosed in Figs. 2 and 14.

The modification of my invention which is illustrated in Figs. 14, 15 and 16 embodies a mechanism adapted forcibly to propel a load lifting lever 75 into engagement with a load after the extending ends of the load carrying arms are brought into a position adjacent the side of the load 73, as depicted in Fig. 16. In the disclosed embodiment, the load lifting lever 75 has two arms 76 and 77 disposed in substantially parallel relationship and normally lying along the outside surfaces of the load carrying arms, such as 35, as shown in Figs. 14 and 15. Also, in this embodiment, the aforementioned propelling force which drives the free ends of the arms into load lifting engagement with a load is provided by a toggle mechanism including tension springs 78 and 79 which are connected to the arms 76 and 77 respectively through movable links 80 and 82.

One end of the spring 78 is anchored to a stud 83 which projects outwardly and to the side of the projecting end of the side portion 38 of the load carrying arm; while one end of the spring 79 is anchored to a stud 84 projecting outwardly from the side and at the extending end of the side portion 39 of the load carrying arm. The other ends of the springs 78 and 79 are connected to ends of the links 80 and 82 respectively which are swingable about fastening pins 85 and 86 by which the other ends of the links are secured to the arms 76 and 77. The arms 76 and 77 are each secured to, and swingable with reference to their load carrying arm about an axis provided by a cross shaft 87 which is journalled in the side portions 38 and 39 of the load carrying arm at a position displaced somewhat from the extending end thereof.

The fastening pins 85 and 86 are disposed in substantially aligned relationship and are displaced from the axis of the cross shaft 87 in a direction opposite that of the anchored ends of the springs. Normally the dispositions of the axes of the fastening pins 85 and 86 and the springs 78 and 79 are so related to the position of the axis of the cross shaft 87 that the load lifting lever 75 is biased to a position extending along the load lifting arm as shown in Figs. 14 and 15, so as to rest against a stop such as 88 projecting outwardly from the load lifting arm.

At least one of the arms 76 or 77 of the load lifting lever has on the outer surface of its mounted end a cam surface 89 which, in the normal position of the arms, shown in Figs. 14 and 15, projects downwardly below the lower surfaces of the load carrying arm to a position for engaging a load supporting surface when the load carrying arm is lowered to a loading position. The shape of the cam surface 89 and its disposition with respect to the axis of the cross shaft 87 are such that when it engages a supporting surface, upon the lowering of the load carrying arms, and before the rollers stop the downward movement of the load carrying arm, the load lifting lever 75 is swung upwardly to a position such that the axis of the fastening pins 85 and 86 crosses a plane extending through the longitudinal action lines of the springs 78 and 79 and the axis of the cross shaft 87. This movement of the load lifting arms transfers the force components of springs 78 and 79 to an extent that they forcibly swing the load lifting arms upwardly about the axis of the cross shaft 87.

The load lifting arms 76 and 77 of the type shown in Figs. 14, 15 and 16 are desirably provided with angularly projecting and relatively sharp load engaging ends 90 and 92 adapted to penetrate the surface of a load, box or crate, as illustrated in Fig. 16, when swung to the load engaging position by the force of the springs 78 and 79. It may thus be understood that when the extending ends of the load carrying arms are brought to a position close to a load, such as 73, and as illustrated in Fig. 16, and the load carrying arms are lowered in such position, the toggle mechanism is actuated by preliminary movement effected by the engagement of the cam surface 89 with a supporting surface and the force of the springs 78 and 79 to drive the load engaging ends 90 and 92 into the side of a load. As the load carrying arms are then moved toward the load, the load is lifted, as previously described and as indicated at 73b in Fig. 16. It is by preference in the form of the load lifting arms disclosed in Figs. 14, 15 and 16 that rounded projections 93 and 94 are provided on the load engaging sides of the lifting arms 76 and 77 to serve as fulcrums which, upon engagement with the surface of a load, facilitate the extraction of the load engaging ends from the load during the movement of the load carrying arms under the load. These projections 93 and 94 may also serve the additional purpose of adding weight near the swinging ends of the load lifting arms in order to increase the momentum of their swinging movement. The engagement of the projections with the side of a load is indicated at 94b in Fig. 16. The load lifting levers are returned to their normal position against the biasing forces of the springs 78 and 79 to recock the toggle mechanisms for another loading operation by the movement of a load onto the load carrying arms.

In the modification of my invention which is illustrated in Fig. 17, a load lifting lever 95 may be of either the type shown in Fig. 2 or the type shown in Fig. 14. In this instance, however, instead of the load engaging edge 74 or the load engaging edge 92, the load lifting lever has a plate 96 of substantial surface area mounted thereon by a pin 97 for limited swinging movement. Projecting from the surface of the plate 96 are a plurality of load engaging pins 98, which are adapted to engage and extend into the side surface of a load to an extent limited by engagement of the plate with the side of the load. This type of load engaging element is particularly adapted to the lifting of loads having comparatively soft or fragile containers, such as corrugated boxes.

As another modification which is illustrated in Fig. 18, the plate 96 may have on its load engaging surface a roughened element 99, such as a toothed metal plate, ribbed rubber plate or even a pebbled cloth or paper, on the order of sand paper. In either of the forms shown in Figs. 17 and 18, the load lifting force is spread over a relatively large surface area and is transmitted through a multiplicity of contact points.

In the modification of my invention which is disclosed in Fig. 19, a load lifting lever such as 75 of Figs. 14, 15 and 16 is contemplated. However, in this instance, the load engaging ends, such as 92, of the load lifting arms are adjoined by angularly disposed projections such as 100 which serves as stops to limit the penetration of the load engaging ends into the side surface of a load.

From the foregoing disclosure, it may be observed that I have provided loading apparatus adaptable to use on conveyances, such as lift trucks, and a method for such loading, which apparatus and method are suited to both loading and unloading operations, and are under the control of the operator of the conveyance so that he may effect such loading and unloading without the aid of equipment separate from the conveyance and by the manipulation of the conveyance.

Although a large portion of the description has placed emphasis upon the avoidance of the use of skids and platforms, and the accomplishment of loading and unloading without such skids or platforms, it is to be understood that the addition of my loading apparatus to a lift truck or other conveyance does not in any way interfere with the use of the conveyance in the usual way for carrying skids or platforms when they are desired.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. Apparatus for effecting the placement of a load upon a conveyance from a supporting surface without the use of a skid or the like and comprising, in combination, longitudinal load carrying members extending along a load carrying portion of the conveyance, sets of rotatably mounted rollers at positions spaced longitudinally along said load carrying members and having axles disposed laterally of the members, the rollers of each set being of a size and so disposed that adjacent portions of their surfaces are normally in engagement and opposed portions of the surfaces thereof are exposed for rolling engagement with said supporting surface and a load and so that movement of the conveyance along said supporting surface with one roller of a set in contact therewith frictionally drives said one roller in one direction and the adjacent roller in the opposite direction, and a prod-type lever mounted at one of its ends for upward swinging movement in a plane extending longitudinally of the load carrying members and relative to one end of said members, a stop determining a load engaging position of said lever in which the lever extends upwardly and beyond said load carrying member at an angle such that the extending end of the lever prods a load well above the level of said supporting surface when forced thereagainst and continued movement toward the load and longitudinally of the carrying members effects upward swinging movement of the lever to lift the prodded side of the load, and said lever having a retracted position extending along the carrying members in a direction opposed to said load engaging position.

2. In apparatus for effecting the placement of a load upon a load carrying portion of a conveyance from a supporting surface without the use of a skid or the like, the combination comprising a prod-type lever, means for mounting said lever at one end of the load carrying portion of the conveyance for swinging movement between load engaging and retracted positions, means for determining each of said positions, said load engaging position being such that the lever extends upwardly and beyond said end of the load carrying portion of the conveyance so that the projecting end thereof prods a load well above the level of the supporting surface when forced thereagainst in a direction longitudinal of the lever, said load engaging position also being such that after prodding the load, continued movement of the lever toward the load exerts a lifting component of force upon the lever and thereby forces said lever to swing upwardly and in a direction opposed to the movement so as to raise the prodded side of the load.

3. In apparatus for effecting the placement of a load upon the load carrying portion of a conveyance from a supporting surface, the combination comprising a load lifting instrumentality including a prod-type element mounted at one end for swinging movement in a vertical plane toward and from a load engaging position, and said load engaging position being one in which said element slopes upwardly toward its free end at an angle such that horizontal force applied through said one end thereof exerts an upward force component at said free end for lifting a load.

4. In apparatus for effecting the placement of a load upon the load carrying portion of a conveyance from a supporting surface as defined in claim 3, the combination being further characterized by a relatively sharp load engaging projection at the free end of the prod-type element, and means on the prod-type element at a position displaced from the projection, engageable with the load during swinging movement of the prod-type element in one direction and adapted to serve as a fulcrum for withdrawing the projection from the load.

5. In apparatus for effecting the placement of a load upon the load carrying portion of a conveyance from a supporting surface as defined in claim 3, the combination being further characterized by a plate-like member hingedly mounted for rotational movement at the free end of the prod-type element and having a normally upright position with a surface facing away from the prod-type element when the prod-type element is in the load engaging position, and a plurality of load lifting points projecting from the latter mentioned surface.

6. In apparatus for effecting the placement of a load upon the load carrying portion of a conveyance from a supporting surface as defined in claim 3, the combination being further characterized by a plate-like member hingedly mounted for rotational movement at the free end of the prod-type element and having a normally upright position with a surface facing away from the prod-type element when the prod-type element is in the load engaging position, and means providing a rough load contacting surface on the latter mentioned surface.

7. In apparatus for effecting the placement of a load upon the load carrying portion of a conveyance from a supporting surface as defined in claim 3, the combination being further characterized by a relatively sharp load engaging projection at the free end of the prod-type element, and means for limiting the penetration of the projection into a load.

8. In apparatus for effecting the placement of a load upon the load carrying portion of a conveyance from a supporting surface as defined in claim 3, the combination being further characterized by a toggle mechanism including a spring for swinging the prod-type element toward the load engaging position with relative rapidity and force.

9. In apparatus for effecting the placement of a load upon the load carrying portion of a conveyance from a supporting surface as defined in claim 3, the combination being further characterized by a toggle mechanism including a spring for swinging the prod-type element toward the load engaging position with relative rapidity and force, and means engageable with said supporting surface for effecting operation of the toggle mechanism.

10. Apparatus for effecting the placement of a load upon a conveyance from a supporting surface without the use of a skid or the like and comprising, in combination, longitudinal load carrying members extending along a load carrying portion of the conveyance, sets of rotatably mounted rollers at positions spaced longitudinally along said load carrying members and having axes disposed laterally of the members, the rollers of each set being of a size and so disposed that adjacent portions of their surfaces are normally in engagement and opposed portions of the surfaces thereof are exposed for rolling engagement with said supporting surface and a load and so that movement of the conveyance along said supporting surface with one roller of a set in contact therewith frictionally drives said one roller in one direction and the adjacent roller in the opposite direction, and a prod-type lever mounted on one of its ends for upward swinging movement in a plane extending longitudinally of the load carrying members and relative to one end of said members, a stop determining a load engaging position of said lever in which the lever extends upwardly and beyond said load carrying member at an angle such that the extending end of the lever prods a load well above the level of said supporting surface when forced thereagainst and continued movement toward the load and longitudinally of the carrying members effects upward swinging movement of the lever to lift the prodded side of the load, and said lever having a retracted position extending along the carrying members in a direction opposed to said load engaging position, each of said sets of rollers including two parallel lower rollers disposed in spaced relationship longitudinally of the carrying members and at positions for engagement with the supporting surface, and a single roller parallel to and normally engaging said two rollers so as to be driven therefrom by friction.

11. Apparatus for effecting the placement of a load upon a conveyance from a supporting surface without the use of a skid or the like and comprising, in combination, longitudinal load carrying members extending along a load carrying portion of the conveyance, sets of rotatably mounted rollers at positions spaced longitudinally along said load carrying members and having axes disposed laterally of the members, the rollers of each set being of a size and so disposed that adjacent portions of their surfaces are normally in engagement and opposed portions of the surfaces thereof are exposed for rolling engagement with said supporting surface and a load and so that movement of the conveyance along said supporting surface with one roller of a set in contact therewith frictionally drives said one roller in one direction and the adjacent roller in the opposite direction, and a prod-type lever mounted at one of its ends for upward swinging movement in a plane extending longitudinally of the load carrying members and relative to one end of said members, a stop determining a load engaging position of said lever in which the lever extends upwardly and beyond said load carrying member at an angle such that the extending end of the lever prods a load well above the level of said supporting surface when forced thereagainst and continued movement toward the load and longitudinally of the carrying members effects upward swinging movement of the lever to lift the prodded side of the load, and said lever having a retracted position extending along the carrying members in a direction opposed to said load engaging position, each of said sets of rollers including two parallel lower rollers disposed in spaced relationship longitudinally of the carrying members and at positions for engagement with the supporting surface, a single roller parallel to and normally engaging said two rollers so as to be driven therefrom by friction, and bearing supports for said rollers providing freedom for movements of the rollers in directions lateral to the axes thereof.

12. Apparatus for effecting the placement of a load upon a conveyance from a supporting surface without the use of a skid or the like and comprising, in combination, longitudinal load carrying members extending along a load carrying portion of the conveyance, sets of rotatably mounted rollers at positions spaced longitudinally along said load carrying members and having axes disposed laterally of the members, the rollers of each set being of a size and so disposed that adjacent portions of their surfaces are normally in engagement and opposed portions of the surfaces thereof are exposed for rolling engagement with said supporting surface and a load and so that movement of the conveyance along said supporting surface with one roller of a set in contact therewith frictionally drives said one roller in one direction and the adjacent roller in the opposite direction, and a prod-type lever mounted at one of its ends for upward swinging movement in a plane extending longitudinally of the load carrying members and relative to one end of said members, a stop determining a load engaging position of said lever in which the lever extends upwardly and beyond said load carrying member at an angle such that the extending end of the lever prods a load well above the level of said supporting surface when forced thereagainst and continued movement toward the load and longitudinally of the carrying members effects upward swinging movement of the lever to lift the prodded side of the load, and said lever having a retracted position extending along the carrying members in a direction opposed to said load engaging position, each of said sets of rollers being carried at opposite ends by plates hingedly connected to said carrying members for swinging movement lateral to said axes of the rollers.

13. Apparatus for effecting the placement of a load upon a conveyance from a supporting surface without the use of a skid or the like and comprising, in combination, longitudinal load carrying members extending along a load carrying portion of the conveyance, sets of rotatably mounted rollers at positions spaced longitudinally along said load carrying members and having axes disposed laterally of the members, the rollers of each set being of a size and so disposed that adjacent portions of their surfaces are normally in engagement and opposed portions of the surfaces thereof are exposed for rolling engagement with said supporting surface and a load and so that movement of the conveyance along said supporting surface with one roller of a set in contact therewith frictionally drives said one roller in one direction and the adjacent roller in the opposite direction, and a prod-type lever mounted at one of its ends for upward swinging movement in a plane extending longitudinally of the load carrying members and relative to one end of said members, a stop determining a load engaging position of said lever in which the lever extends upwardly and beyond said load carrying member at an angle such that the extending end of the lever prods a load well above the level of said supporting surface when forced thereagainst and continued movement toward the load and longitudinally of the carrying members effects upward swinging movement of the lever to lift the prodded side of the load, and said lever having a retracted position extending along the carrying members in a direction opposed to said load engaging position, each of said sets of rollers including two parallel lower rollers disposed in spaced relationship longitudinally of the carrying members and at positions for engagement with the supporting surface, a single roller parallel to and normally engaging said two rollers so as to be driven therefrom by friction, and end members carrying said rollers and hingedly connected to the carrying members for swinging movement laterally of the carrying members.

14. Apparatus for effecting the placement of a load upon a conveyance from a supporting surface without the use of a skid or the like and comprising, in combination, longitudinal load carrying members extending along a load carrying portion of the conveyance, sets of rotatably mounted rollers at positions spaced longitudinally along said load carrying members and having axes disposed laterally of the members, the rollers of each set being of a size and so disposed that adjacent portions of their surfaces are normally in engagement and opposed portions of the surfaces thereof are exposed for rolling engagement with said supporting surface and a load and so that movement of the conveyance along said supporting surface with one roller of a set in contact therewith frictionally drives said one roller in one direction and the adjacent roller in the opposite direction, and a prod-type lever mounted at one of its ends for upward swinging movement in a plane extending longitudinally of the load carrying members and relative to one end of said members, a stop determining a load engaging position of said lever in which the lever extends upwardly and beyond said load carrying member at an angle such that the extending end of the lever prods a load well above the level of said supporting surface when forced thereagainst and continued movement toward the load and longitudinally of the carrying members effects upward swinging movement of the lever to lift the prodded side of the load, and said lever having a retracted position extending along the carrying members in a direction opposed to said load engaging position, said lever having an arcuate surface portion thereon concentric with the axis of swinging movement of the lever and of a size frictionally to engage the supporting surface when rollers of said groups are in engagement with said supporting surface.

15. Apparatus for effecting the placement of a load upon a conveyance from a supporting surface without the use of a skid or the like and comprising, in combination, longitudinal load carrying members extending along a load carrying portion of the conveyance, sets of rotatably mounted rollers at positions spaced longitudinally along said load carrying members and having axes disposed laterally of the members, the rollers of each set being of a size and so disposed that adjacent portions of their surfaces are normally in engagement and opposed portions of the surfaces thereof are exposed for rolling engagement with said supporting surface and a load and so that movement of the conveyance along said supporting surface with one roller of a set in contact therewith frictionally drives said one roller in one direction and the adjacent roller in the opposite direction, and a prod-type lever mounted at one of its ends for upward swinging movement in a plane extending longitudinally of the load carrying members and relative to one end of said members, a stop determining a load engaging position of said lever in which the lever extends upwardly and beyond said load carrying member at an angle such that the extending end of the lever prods a load well above the level of said supporting surface when forced thereagainst and continued movement toward the load and longitudinally of the carrying members effects upward swinging movement of the lever to lift the prodded side of the load, and said lever having a retracted position extending along the carrying members in a direction opposed to said load engaging position, said lever having an arcuate surface portion thereon concentric with the axis of swinging movement of the lever and of a size frictionally to engage the supporting surface when rollers of said groups are in engagement with that supporting surface, said lever also having a substantially flat surface portion on the mounted end thereof at a position for engagement with the supporting surface when the lever is in the load engaging position, the latter mentioned surface, by engagement with the supporting surface, tending to resist initial swinging movement of the lever away from said load engaging position as the conveyance moves toward the load after engagement of the lever with the load.

16. In apparatus for effecting the placement of a load upon a conveyance from a supporting surface without the use of a skid or the like, the combination comprising load carrying parts on said conveyance having substantially parallel upper and lower surfaces, groups of rollers mounted in substantially parallel relationship at spaced positions along said load carrying parts of the conveyance, said rollers having axes of rotation disposed between the upper and lower surfaces of said parts, the rollers of each group being of a size and so disposed that adjacent portions of their surfaces are engaged and opposed surface portions of different rollers are exposed above and below said upper and lower surfaces respectively for engagement with the load and supporting surface, the engagement of the rollers of each group providing a driving connection such that movement of one roller of a group along and in contact with the supporting surface effects rotation thereof in one direction and rotation of the engaging roller in the opposite direction, and said axes of rotation of the rollers of each group being shiftable within predetermined limits in directions transverse to the said axes, at least one of said groups of rollers including two parallel lower rollers disposed in spaced relationship and normally extending below the lower surfaces of the load carrying parts, and a third roller parallel to and normally engaging said two rollers and normally extending above the upper surfaces of the load carrying parts.

17. In apparatus for effecting the placement of a load upon a conveyance from a supporting surface without the use of a skid or the like, the combination comprising load carrying parts on said conveyance having substantially parallel upper and lower surfaces, groups of rollers mounted in substantially parallel relationship at spaced positions along said load carrying parts of the conveyance, said rollers having axes of rotation disposed between the upper and lower surfaces of said parts, the rollers of each group being of a size and so disposed that adjacent portions of their surfaces are engaged and opposed surface portions of different rollers are exposed above and below said upper and lower surfaces respectively for engagement with the load and supporting surface, the engagement of the rollers of each group providing a driving connection such that movement of one roller of a group along and in contact with the supporting surface effects rotation thereof in one direction and rotation of the engaging roller in the opposite direction, and opposite ends of each group of rollers being carried relative to the load carrying parts by plates hingedly connected to the load carrying parts, whereby said axes of rotation of the rollers of each group are shiftable within predetermined limits in directions transverse to the said axes.

18. In apparatus for effecting the placement of a load upon a load carrying portion of a conveyance from a supporting surface without the use of a skid or the like, the combination comprising a prod-type lever, means for mounting said lever at one end of the load carrying portion of the conveyance for swinging movement between load engaging and retracted positions, means for determining each of said positions, said load engaging position being such that the lever extends upwardly and beyond said end of the load carrying portion of the conveyance so that the projecting end thereof prods a load well above the level of the supporting surface when forced thereagainst in a direction longitudinal of the lever, said load engaging position also being such that after prodding the load, continued movement of the lever toward the load forces said lever to swing upwardly and in a direction opposed to the movement so as to raise the prodded side of the load, said lever having an arcuate surface portion at the mounted end thereof and concentric with the axis of swinging movement of the lever, said arcuate surface being exposed for engagement with the supporting surface during movements of the conveyance to effect swinging movement of the lever to said positions.

19. In apparatus for effecting the placement of a load upon a load carrying portion of a conveyance from a supporting surface without the use of a skid or the like, the combination comprising a prod-type lever, means for mounting said lever at one end of the load carrying portion of the conveyance for swinging movement between load engaging and retracted positions, means for determining each of said positions, said load engaging position being such that the lever extends upwardly and beyond said end of the load carrying portion of the conveyance so that the projecting end thereof prods a load well above the level of the supporting surface when forced thereagainst in a direction longitudinal of the lever, said load engaging position also being such that after prodding the load, continued movement of the lever toward the load forces said lever to swing upwardly and in a direction opposed to the movement so as to raise the prodded side of the load, said lever having an arcuate surface portion at the mounted end thereof and concentric with the axis of swinging movement of the lever, said arcuate surface being exposed for engagement with the supporting surface during movements of the conveyance to effect swinging movement of the lever to said positions, and said lever also having thereon a flat surface at a position for engagement with the supporting surface when the lever is in the load engaging position so as to resist initial movement of the lever from the load engaging position as the conveyance is moved toward the load after engagement of the lever with the load.

20. In apparatus for effecting the placement of a load upon a conveyance from a supporting surface without the use of a skid or the like, the combination comprising a load carrier having upper and lower sides, upper and lower rollers mounted in substantially parallel relationship in said load carrier with axes of rotation disposed between the upper and lower sides, the rollers being of appropriate size and so disposed that adjacent portions of their surfaces are engaged and opposed surface portions are exposed above and below said upper and lower sides respectively for engagement with the load and supporting surface, the engagement of the rollers providing a driving connection such that movement of the lower roller along and in contact with the supporting surface effects rotation thereof in one direction and rotation of the upper roller in the opposite direction, and means mounting the rollers in the load carrier for shifting of the axes of rotation of the rollers transverse to said axes whereby movement of the load carrier away from the supporting surface permits the rollers to drop until the load rests on the upper side of load carrier.

21. In apparatus for effecting the placement of a load upon a conveyance as defined in claim 20, the combination being further characterized by a plurality of upper rollers and a plurality of lower rollers distributed along the load carrier, each upper roller being associated with a lower roller in the manner defined in claim 20, and means mounting the ends of all the upper and lower rollers in the load carrier for shifting of their axes of rotation transverse to said axes for the purpose set forth in claim 20.

22. In apparatus for effecting the placement of a load upon a conveyance from a supporting surface without the use of a skid or the like, the combination comprising a load carrier having upper and lower sides, sets of rollers spaced along the load carrier, each set comprising one upper roller and two lower rollers mounted in substantially parallel relationship in said load carrier with axes of rotation disposed between the upper and lower sides, the rollers being of appropriate size and so disposed that the surfaces of the two lower rollers and the upper roller of a set are engaged at adjacent portions and are exposed above and below said upper and lower sides respectively at opposed portions for engagement with the load and supporting surface, the engagement of the rollers providing a driving connection such that movement of the lower rollers along and in contact with the supporting surface effects rotation thereof in one direction and rotation of the upper roller in the opposite direction, and means mounting the rollers in the load carrier for shifting of the axes of rotation of the rollers transverse to said axes whereby movement of the load carrier away from the supporting surface permits the rollers to drop until the load rests on the upper side of load carrier.

23. In apparatus for effecting the placement of a load upon a load carrier of a conveyance from a supporting surface without the use of a skid or the like, the combination comprising a prod-type lever, means for mounting said lever at one end of the load carrier of the conveyance for swinging movement between load-engaging and retracted positions, means for determining each of said positions, said load-engaging position being such that the lever extends upwardly and beyond said end of the load carrier of the conveyance so that the projecting end thereof prods a load well above the level of the supporting surface when forced thereagainst in a direction longitudinal of the lever, said load-engaging position also being such that after prodding the load, continued movement of the lever toward the load forces said lever to swing upwardly and in a direction opposed to the movement so as to raise the prodded side of the load, and means engageable with the supporting surface for causing movement of the load carrying portion over the supporting surface to effect swinging movement of the lever to said positions.

WM. W. SMITH.

REFERENCES CITED

The following references are of record in the file of this patent:

UNITED STATES PATENTS

| Number | Name | Date |
|---|---|---|
| 1,425,727 | Wallstrom | Aug. 15, 1922 |
| 1,636,574 | Perry | July 19, 1927 |
| 1,924,885 | Schreck | Aug. 29, 1933 |
| 2,388,458 | Alfonte | Nov. 6, 1945 |
| 2,432,182 | Turner | Dec. 9, 1947 |
| 2,468,055 | Gibler | Apr. 26, 1949 |
| 2,478,196 | Johnson et al. | Aug. 9, 1949 |
| 2,517,938 | Stevenson | Aug. 8, 1950 |

FOREIGN PATENTS

| Number | Country | Date |
|---|---|---|
| 204,943 | Great Britain | Oct. 11, 1923 |
| 450,523 | Great Britain | Oct. 15, 1934 |